US007021640B2

(12) United States Patent
Knopf et al.

(10) Patent No.: US 7,021,640 B2
(45) Date of Patent: Apr. 4, 2006

(54) WHEELCHAIR AND WHEEL MOUNTING ASSEMBLY THEREFORE

(75) Inventors: Michael Knopf, Dielheim (DE); Adam John Williams, Redditch (GB)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 10/670,494

(22) Filed: Sep. 24, 2003

(65) Prior Publication Data

US 2004/0155429 A1 Aug. 12, 2004

Related U.S. Application Data

(63) Continuation of application No. PCT/GB02/03635, filed on Aug. 8, 2002.

(30) Foreign Application Priority Data

Aug. 8, 2001 (GB) .................................... 0119279

(51) Int. Cl.
*B62D 21/14* (2006.01)
*B62M 1/14* (2006.01)

(52) U.S. Cl. ...................................... 280/250.1; 280/43

(58) Field of Classification Search ............. 280/250.1, 280/242.1, 304.1, 43 X, 642, 650, 647, 641
See application file for complete search history.

(56) References Cited

U.S. PATENT DOCUMENTS

| | | | | |
|---|---|---|---|---|
| 4,351,540 | A * | 9/1982 | Minnebraker | 280/250.1 |
| 4,405,142 | A * | 9/1983 | Whetstine | 280/250.1 |
| 5,253,888 | A | 10/1993 | Friedrich | |
| 5,284,350 | A | 2/1994 | Geiger et al. | |
| 5,360,224 | A * | 11/1994 | Geiger et al. | 280/250.1 |
| 5,743,545 | A * | 4/1998 | Kunze et al. | 280/250.1 |
| 6,311,999 | B1 * | 11/2001 | Kueschall | 280/250.1 |
| 6,464,243 | B1 * | 10/2002 | Roche | 280/650 |
| 6,520,594 | B1 * | 2/2003 | Amirola | 301/111.06 |
| 2001/0008335 | A1 * | 7/2001 | Roche | 280/278 |
| 2003/0189317 | A1 * | 10/2003 | Chen et al. | 280/650 |

FOREIGN PATENT DOCUMENTS

DE 39 14 406 1/1994

* cited by examiner

*Primary Examiner*—Tony Winner
(74) *Attorney, Agent, or Firm*—MacMillan, Sobanski & Todd, LLC

(57) ABSTRACT

An improved adjustable wheel mounting assembly comprises a connecting member and a wheel-mounting member. The connecting member extends generally upwardly and downwardly between wheelchair frame members and is adapted to be secured thereto. The wheel-mounting member extends adjacent the connecting member and is secured thereto and to the side frame members. The wheel-mounting member has at least one formation for supporting an axle of the wheel.

20 Claims, 4 Drawing Sheets

WHEELCHAIR AND WHEEL MOUNTING ASSEMBLY THEREFORE

CROSS REFERENCE TO RELATED APPLICATIONS

This application claims the benefit of and is a continuation of pending international application No. PCT/GB02/03635 filed Aug. 8, 2002, which claims the benefit of GB patent application No. 0119279.8, filed on Aug. 8, 2001, each of which is incorporated herein by reference.

BACKGROUND OF INVENTION

This invention relates in general to land vehicles and more particularly, to personal mobility vehicles, such as wheelchairs, scooters, and the like. Most particularly, the invention relates to an assembly for mounting drive wheels to wheelchairs.

Wheelchairs are well known for increasing the mobility of the physically impaired. Typically, a wheelchair comprises a seat supported by a frame, which is carried by two drive wheels and two castors. In a manual wheelchair, the drive wheels are adapted for manual propulsion. Such drive wheels are typically provided with drive rims, which can be grasped by the occupant of the wheelchair to turn the wheels and thereby propel the wheelchair. There have been proposals for the provision of electric motors to drive such wheels. The motors can propel or assist in propulsion of a wheelchair and thereby, enable a manually propelled wheelchair to be converted into an electrically propelled or assisted wheelchair. Such a wheelchair is also then required to be equipped with one or more batteries and an appropriate control system.

Wheelchair frames for manual wheelchairs usually comprise left and right side frame parts, connected together by a cross-frame, which may include a folding mechanism. The side frames each comprises upper and lower frame members extending generally parallel to one another, forward and rearward of the wheelchair, and connected at or towards the front and rear of the wheelchair by upright or generally upright parts. Provision is made for the attachment of the drive wheels of the wheelchair and for the castors.

One important feature provided in some wheelchairs is its ability to be adjusted in various dimensional aspects to suit a particular or intended wheelchair occupant. One such adjustment is with respect of the height of the drive wheels relative to the wheelchair frame. Ideally, the drive wheels are also able to be adjusted forward and rearward of the wheelchair.

SUMMARY OF INVENTION

The present invention is directed towards an improved adjustable wheel mounting assembly. The wheel mounting assembly comprises a connecting member and a wheel-mounting member. The connecting member extends generally upwardly and downwardly between wheelchair frame members and is adapted to be secured thereto. The wheel-mounting member extends adjacent the connecting member and is secured thereto and to the side frame members. The wheel-mounting member has at least one formation for supporting an axle of the wheel.

The present invention is also directed towards a wheelchair comprising a side frame comprising a frame part and a wheel mounting assembly for mounting a wheel to the frame part. The frame part comprises an upper side frame member and a lower side frame member. The wheel mounting assembly comprises a connecting member and a wheel-mounting member. The connecting member extends generally upwardly and downwardly between the frame members and is adapted to be secured thereto. The wheel-mounting member extends adjacent the connecting member and is secured thereto and to the side frame members. The wheel-mounting member has at least one formation for supporting an axle of the wheel.

Various objects and advantages of this invention will become apparent to those skilled in the art from the following detailed description of the preferred embodiment, when read in light of the accompanying drawings.

DETAILED DESCRIPTION

Figure 1:
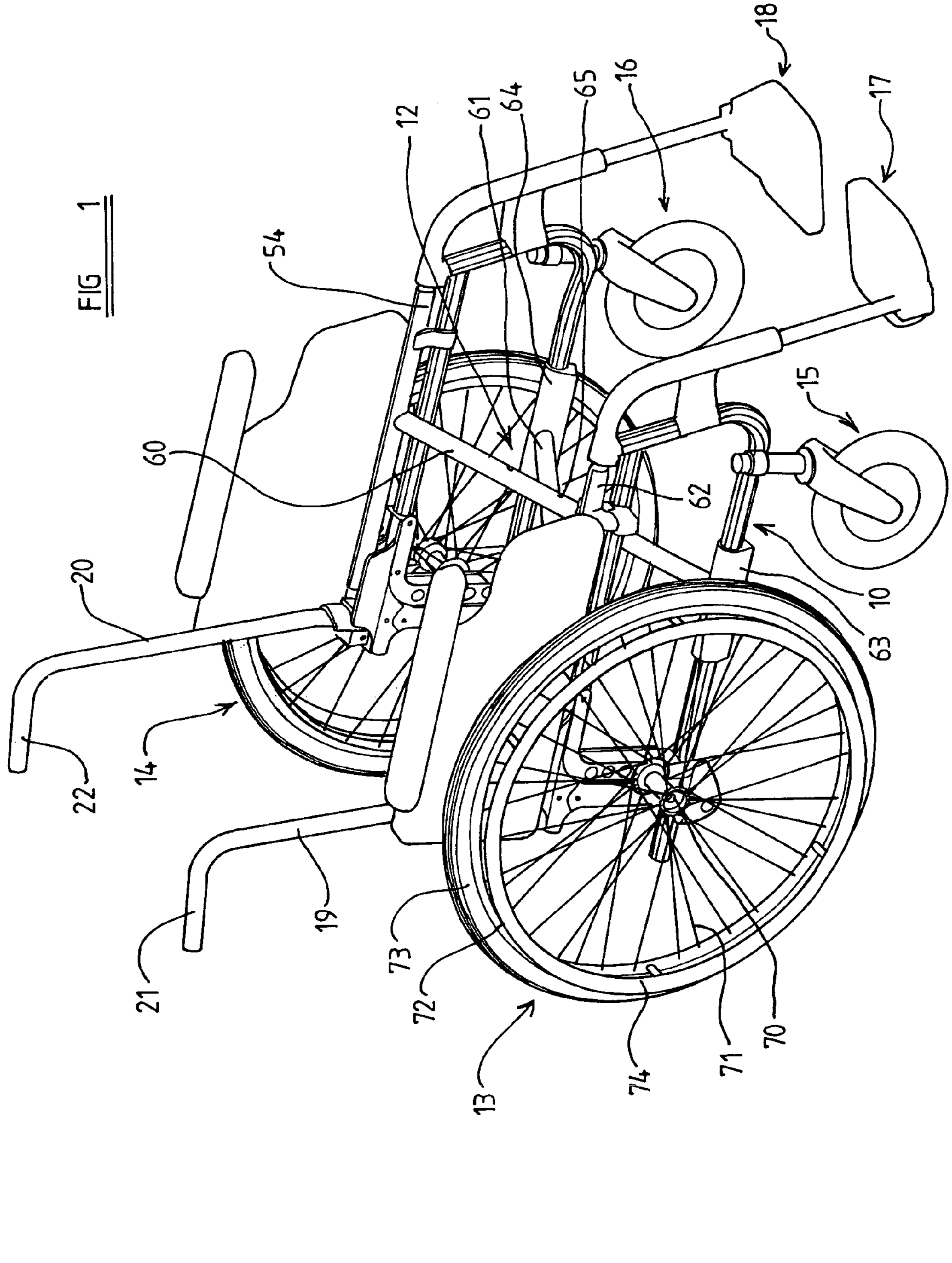
FIG. 1 is a perspective view of the principal structural components of a wheelchair and a wheel mounting assembly according to one embodiment of the invention.

Referring now to the drawings, there is illustrated in FIG. 1 a wheelchair, which comprises a frame having two side frame parts 10, 11 and a cross-brace assembly, indicated generally at 12. There are rear drive wheels 13, 14 respectively at the right-hand side and left-hand side of the wheelchair, carried by respective wheel mounting assemblies on the side frames 10, 11 in the manner to be described hereinbelow. There are also respective front castor wheels 15, 16 carried by the side frames towards the front end thereof. Footrest assemblies, indicated generally at 17, 18, are detachably secured at the front of the respective side frames and are preferably adjustable to suit the intended occupant of the wheelchair. Armrests, which are preferably carried by the side frames, are adapted for use of the occupant. Upright rear posts 19, 20, which are preferably slightly rearward inclined, are preferably carried by the wheel mounting assemblies, at or towards the rear of the side frames, in the manner to be described hereinbelow. The posts 19, 20 may carry a seat back member (not shown), which may be upholstered. The upper ends of the post 19, 20 may extend rearward to form handles 21, 22 by which the wheelchair can be propelled and maneuvered by an attendant (i.e., a person standing or walking behind the wheelchair).

Figure 2:
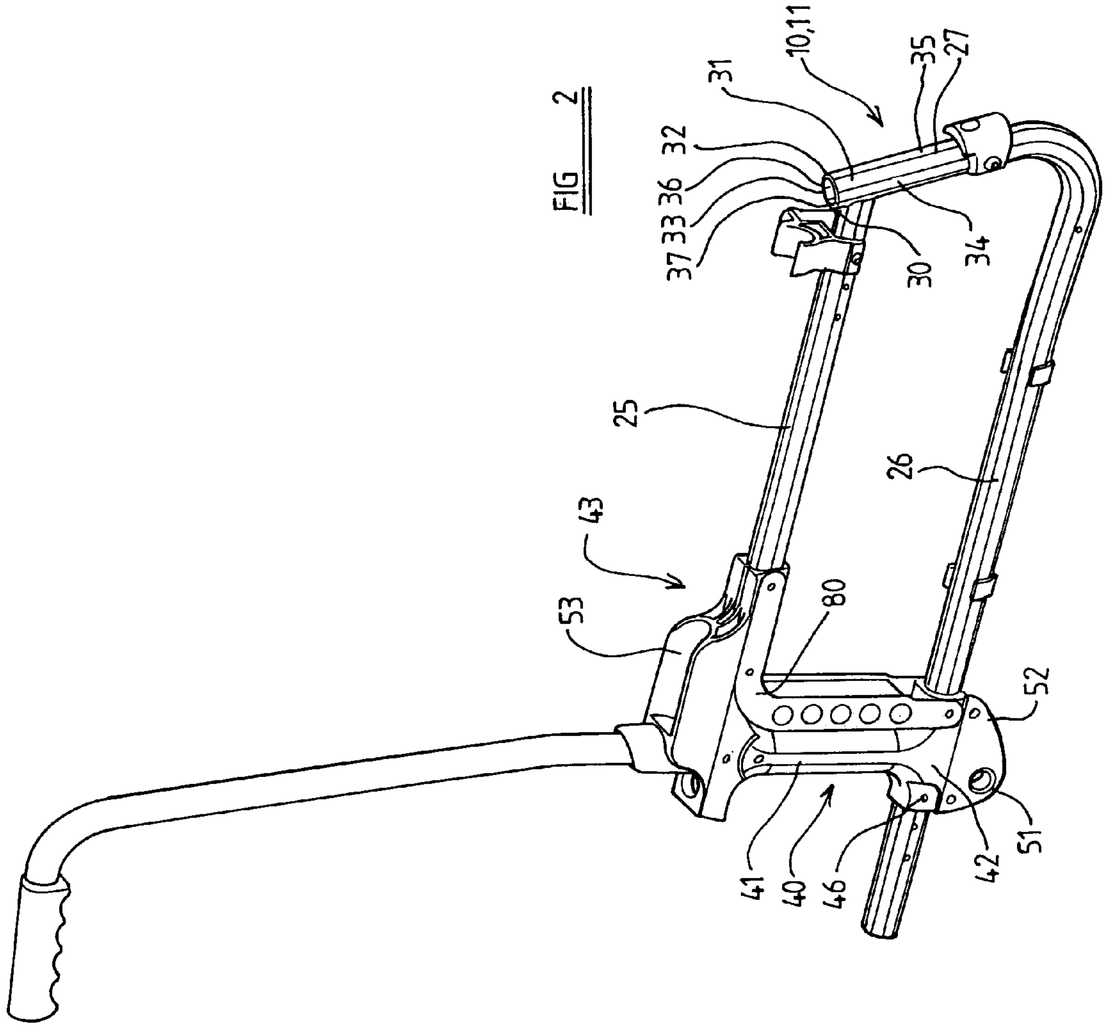
FIG. 2 is a perspective view of a side frame of the wheelchair and the wheel mounting assembly shown in FIG. 1.
Figure 3:
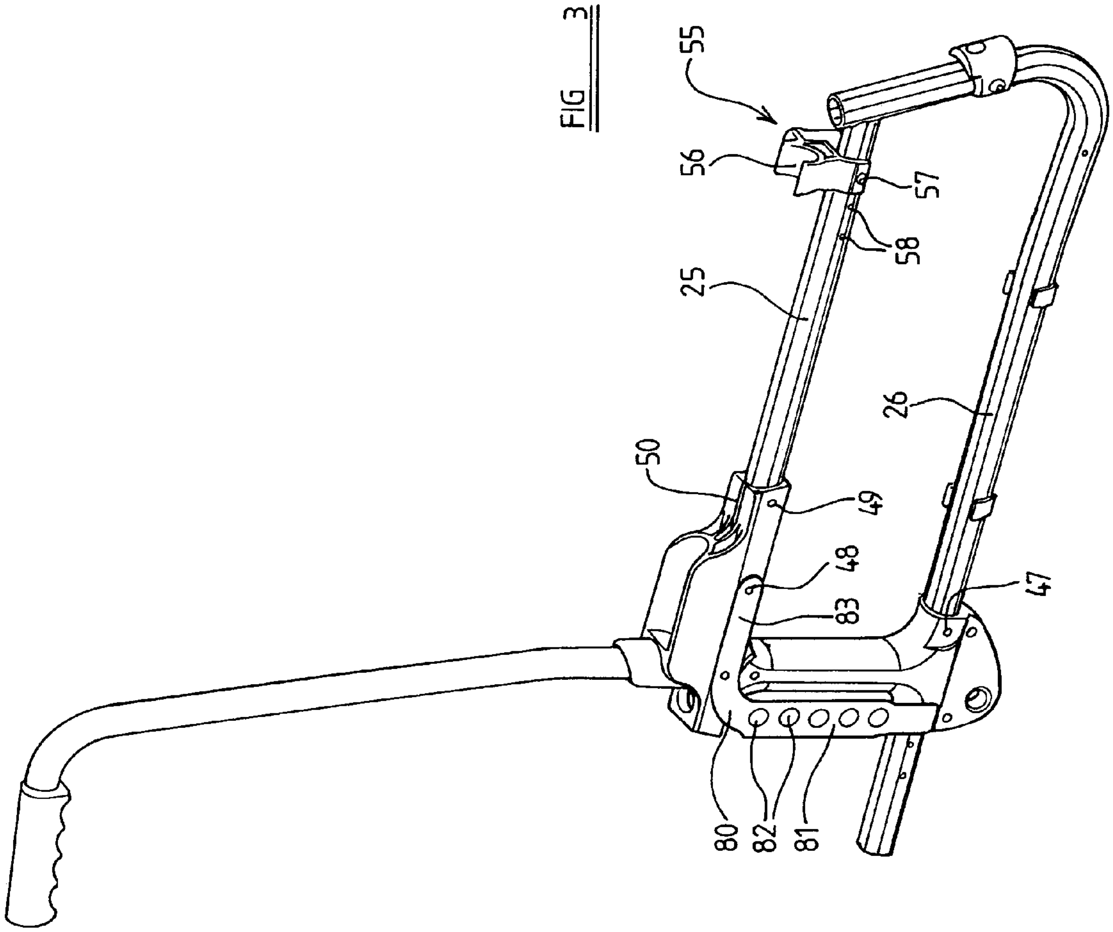
FIG. 3 is a perspective view of the side frame of the wheelchair and the wheel mounting assembly in an alternative condition.
Figure 4:
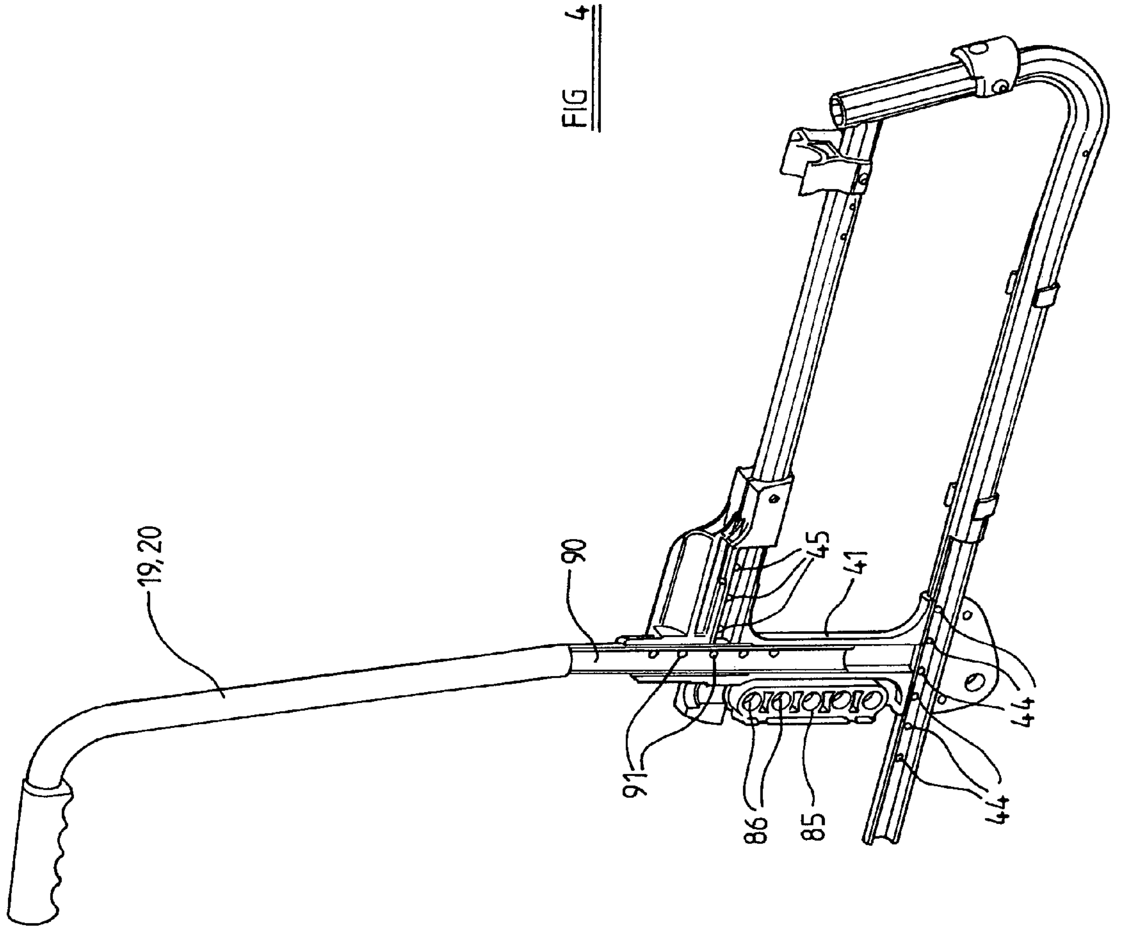
FIG. 4 is a partially broken-away view the side frame of the wheelchair and the wheel mounting assembly shown in FIG. 3.

The side frame 10 or 11 is shown in greater detail in FIGS. 2–4. It comprises an upper frame member or rail 25 and a lower frame member or rail 26. The rails 25, 26 may be tubular and of metal, preferably extruded from an aluminum alloy, or may be of other material. At the front of the side frame, the lower rail 26 is bent upwardly so that an inclined part 27 extends upwardly and rearward to meet the front end of the upper rail 25 to which the lower rail 26 is joined (e.g., by welding). The cross-sectional shape of the exterior of the tubular material from which the rails 25, 26 are made is preferably non-circular. Most preferably, cross-sectional shape comprises four arcuate portions 30, 31, 32, 33, which are equally circumferentially spaced about the tubular material and are joined by four flat portions 34, 35, 36, 37 therebetween, which are parts of the sides of a square. The arcuate portions 30–33 form respective parts of a circumscribing circle within which the flat portions 34–37 lie. The cross-sectional shape can be considered to be a square with corners removed and replaced by part-circular portions. The tubular material from which the rails are made preferably has approximately constant wall thickness and this shape is most clearly seen at the open upper end of the upwardly and rearward extending portion 27 of the lower rail 26.

The upper and lower rails 25, 26 extend forward and rearward of the wheelchair, preferably substantially parallel to one another. At the rear end of the upper rail 25, and towards the rear end of the lower rail 26, a connecting member 40 joins the rails 25, 26. The connecting member 40, for example, may be a molding of a plastic material or may be a metal die-casting. The connecting member 40 preferably comprises a tubular upright part 41 having a lower end with a forward and rearward extending socket part 42 through which the lower rail 26 extends. At the upper end of part 41, there is a forward extending part 43, which affords a socket into which the rear end of the upper rail 25 extends. The internal shape of the sockets afforded by the parts 42, 43 of the connecting member 40 corresponds to the external cross-sectional shape of the rails 25, 26. In this way, the rails 25, 26 fit closely within the socket parts of the connecting member 40 so as to be resistant to relative angular movement therein about the longitudinal axes of the respective rails 25, 26. However, the position of the connecting member 40 may be adjusted forward and rearward relative to the rails 25, 26. The connecting member 40 may be fixed in the required or desired position by fasteners, such as bolts passed transversely through the socket parts of the connecting member 40 and transverse apertures in the rails 25, 26. In the drawings, the connecting member 40 is shown in its forward most position relative to the rails 25, 26 and a number of apertures in the rails 25, 26 for receiving such fasteners are indicated at 44, 45 in FIG. 4 of the drawings. Apertures in the connecting member 40 through which such fasteners may be passed are indicated at 46, 47 (i.e., in the part 42 of the connecting member 40) and 48, 49 (i.e., in the part 43 of the connecting member 40). The part 43 is provided with a lengthwise discontinuity or slot 50 so that, when fasteners are passed transversely through the apertures 48, 49 and tightened, the rail 25 is clamped therein to provide a secure connection. The part 42 of the connecting member 40 may similarly be provided with a slot or slots in its parts having the apertures 46, 47. The slot also helps assembly, by enabling easier fitting of the rails 25, 26 into the receiving socket formations in the connecting member 40.

Beneath the part 42, the connecting member 40 has an attachment part 52 provided with an aperture 51 extending transversely relative to the wheelchair. This part 52 may provide for the fitting of a smaller wheel (e.g., for a wheelchair which would only be pushed by an attendant and not propelled by its occupant). Above the part 43, there is an upwardly facing part-cylindrical cradle formation 53 for receiving one end of a seat-supporting member 54 of the cross-brace assembly 12. The other end of the seat-supporting member 54 can be accommodated in a cradle member 55, which is secured to the upper rail 25 adjacent the front end of the upper rail 25, and has an upwardly facing formation 56, which receives the seat-supporting member 54. The cradle member 55 is preferably secured to the rail 25 by a transverse bolt 57, which may extend through parts of the cradle member 55 and through the rail 25. The position of the cradle member 55 is preferably adjustable lengthwise of the rail 25 and it is fixed in the required position by passing the bolt 57 through a selected one of a number of transverse holes 58 along the rail 25.

The cross-brace assembly 12 preferably comprises a first cross-brace member 60, at one end of which is provided the seat-supporting member 54, and a second cross-brace member 61, which at one end thereof is provided with a corresponding seat-supporting member 62. At an end of the cross-brace member 61 opposite the seat-supporting member 54, the cross-brace member 60 has a pivot member 63, which is pivotable about the lower rail 26 of the side frame 10 of the wheelchair. Similarly, the cross-brace member 61 has a pivot member 64 pivotable about the lower rail 26 of the side frame 11. Each of the pivot members 63, 64 engages the arcuate portions of the external cross-sectional shape of the material constituting the lower rail 26 of the side frame 11, so that the pivot members 63, 64 are pivotable thereabout. The two cross-brace members 60, 61 are pivotally connected to one another in their respective mid-regions by a pivot bolt 65. It will be appreciated that this arrangement of the cross-brace members 60, 61 enables the wheelchair to assume a more compact configuration with respect to the width of the wheelchair by enabling the two side frames 10, 11 of the wheelchair closely to approach one another. This facilitates easy transportation and storage of the wheelchair when the wheelchair is not in use. When required to be used, the wheelchair can be deployed to its operative condition wherein the seat-supporting members 54, 62 of the cross-brace assembly 12 engage the receiving formations on the upper rails 25 of the side frames 10, 11.

A seat (not shown) of flexible material may be carried by the seat-supporting members 54, 62 of the cross-brace assembly 12. When the wheelchair is deployed for use, the seat may be pulled taut between the seat-supporting members 54, 62.

The cross-brace assembly 12 may be adjustable forward and rearward of the wheelchair, with its position fixed by constraining the pivot members 63, 64 between stop members fixed to the lower rails 26 of the wheelchair side frames 10, 11. Such stop members may comprise fasteners that pass through selected ones of a number of transverse apertures spaced along the lower rails 26. This enables some adjustment of seat position forward and rearward of the wheelchair.

Each of the drive wheels 13, 14 of the wheelchair may comprise a hub 70, spokes 71, and a rim 72. The hub 72 may be carried by bearings on an axle. The rim 72 may carry a ground-engaging tire 73. Also carried by the rim 72 is a propulsion rim 74, which can be grasped by the occupant of the wheelchair to propel and maneuver the wheelchair as required. Each of the wheels 13, 14 is carried relative to its respective side frame 10, 11 by a wheel mounting assembly, which comprises the connecting member 40 and, on each side thereof, a wheel-mounting member 80. Each wheel-mounting member 80 comprises portions in generally L-shaped disposition, namely an upright portion 81 and a horizontal portion 83. The upright portion 81 preferably has a number of vertically spaced openings that are able to receive the axle of the wheel. The horizontal portion 83 preferably lies alongside the part 43 of the connecting member 40. As illustrated, each wheel-mounting member 80 may be in the form of an L-shaped plate with free ends of portions 81, 83 of the wheel-mounting member 80 joined by a bracing member. Alternatively, each wheel-mounting member 80 may be of triangular or other configuration, for greater strength and/or to provide for the attachment of further components. Yet a further possibility is that a single wheel-mounting member 80 only might be provided, disposed alongside the connecting member 40. The wheel-mounting members 80 can be fitted in either a forwards or rearwards position relative to the connecting member 40, as shown in the former position in FIG. 2 and in the latter in FIG. 3. In these positions, the upright parts of the wheel-mounting members 80 can lie forward or rearward of the upright part 41 of the connecting member 40. The wheel-mounting members 80 can be secured to the connecting member 40 by bolts passing transversely through the wheel-mounting members 80, connecting member 40, and apertures, if required, in the rail members 25, 26.

A spacing member 85, preferably plastic, visible in FIG. 4, may be provided between the upright parts 81 of the wheel-mounting members 80, forward or rearward of the connecting member 40, as the case may be. The spaced apertures 82 of the wheel-mounting members 80 are adapted to align with apertures 86 in the spacing member 85 to receive the axle on which the wheel 13, 14 is carried. The axle may have a quickly detachable retaining fitting enabling easy removal of the wheels from the wheelchair when desired, such as, for storage/transportation of the wheelchair when folded to a more compact configuration.

Finally, FIG. 4 of the drawings shows how a tubular lower part 90 of the rear post 19, 20 is received in tubular upright part 41 of the connecting member 40. The part 90 is provided with a number of spaced transverse apertures 91 and is fixed at the required height relative to the connecting member 40 by a bolt passing transversely through the connecting member 40 and the post part 90.

It will be appreciated that the above-described arrangement enables ready adjustment, and fixing in required adjusted positions, in respect of the wheel base, wheel mounting height, seat depth, and rear post height of the wheelchair whilst providing a simple yet strong and rigid construction.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A wheel mounting assembly for mounting a wheel of a wheelchair to a frame part thereof, the frame part including an upper side frame member and a lower side frame member, the wheel mounting assembly comprising:

a connecting member extending generally upwardly and downwardly between the frame members and adapted to be secured thereto; and a wheel-mounting member extending adjacent the connecting member and secured thereto and secured directly to the side frame members, the wheel-mounting member having at least one formation for supporting an axle of the wheel.

2. A wheel mounting assembly according to claim 1 wherein the wheel-mounting member is adapted to be secured in alternative forward or rearward positions relative to the connecting member.

3. A wheel mounting assembly according to claim 1 wherein the wheel-mounting member comprises one or more mounting plates and there is a spacing member between parts of the mounting plates having the apertures therein.

4. A wheel mounting assembly according to claim 1 wherein the wheel-mounting member comprises portions in a generally L-shaped disposition wherein one of the portions extends upwardly alongside the connecting member and another one of the portions is adapted to extend alongside one of the side frame members.

5. A wheel mounting assembly according to claim 1 wherein the connecting member has a tubular upright part that is adapted to receive a back post member of a wheelchair seat.

6. A wheelchair comprising:

a side frame comprising a frame part comprising an upper side frame member and a lower side frame member; and a wheel mounting assembly for mounting a wheel to the frame part, the wheel mounting assembly comprising:

a connecting member extending generally upwardly and downwardly between the frame members and adapted to be secured thereto; and a wheel-mounting member extending adjacent the connecting member and secured thereto and secured directly to the side frame members, the wheel-mounting member having at least one formation for supporting an axle of the wheel.

7. A wheelchair according to claim 6 wherein the upper and lower frame members each have an external cross-sectional shape which is non-circular and includes circumferentially spaced portions of a circumscribing circle with remaining portions therebetween which lie within the circle, and wherein the connecting member has receiving formations wherein the upper and lower frame members are received, the receiving formations having an internal cross-sectional shape which cooperates with at least the remaining portions of the external cross-sectional shape of the frame members to prevent relative movement between the connecting member and the side frame members about longitudinal axes of the frame members.

8. A wheelchair comprising:

a frame having a frame part comprising an upper frame member and a lower frame member, each having a cross-sectional shape that is non-circular with arcuate portions which are circumferentially spaced and joined by flat portions, which are parts of the sides of a square, the arcuate portions forming parts of a circumscribing circle within which the flat portions lie, and a wheel mounting assembly on the side frame for carrying a wheel relative to the frame, a connecting member comprising an upright part, a lower socket part through which the lower frame member extends, and an upper socket into which the upper frame member extends, the socket parts having an internal shape that corresponds to the cross-sectional shape of the frame members to fit closely within the socket parts of the connecting member so as to be resistant to relative angular movement therein about the longitudinal axes of the frame parts, a wheel-mounting member disposed alongside the connecting member, the wheel-mounting member having an upright portion having a number of vertically spaced openings that are able to receive an axle of the wheel; and an upright rear post received in the upright part of the connecting member, the post carrying a seat back member.

9. The wheelchair of claim 8 wherein the connecting member is further structured to be adjustable forward and rearward relative to the frame parts.

10. The wheelchair of claim 8 wherein the connecting member is structured to be fixed in a desired position by fasteners that passed transversely through the socket parts of the connecting member and through transverse apertures in the frame parts.

11. The wheelchair of claim 10 wherein at least of the socket parts has with a lengthwise discontinuity so that, when fasteners are passed transversely through the apertures and tightened, the frame part is clamped therein to provide a secure connection.

12. The wheelchair of claim 8 wherein the connecting member further has an attachment part provided with an aperture for the fitting of a smaller wheel.

13. The wheelchair of claim 8 further comprises an upwardly facing cradle formation for receiving one end of a seat-supporting member of a cross-brace assembly.

14. The wheelchair of claim 8 wherein the wheel-mounting member is a generally L-shaped disposition further comprising a horizontal portion lying alongside the upper socket part of the connecting member.

15. The wheelchair of claim 14 wherein the wheel-mounting member is in the form of an L-shaped plate with free ends of portions of the wheel-mounting member joined by a bracing member.

16. The wheelchair of claim 14 wherein the wheel-mounting member is of triangular configuration.

17. The wheelchair of claim 8 wherein the wheel-mounting member is fitted in either a forwards or rearwards position relative to the connecting member so that the upright part of the wheel-mounting member can lie forward or rearward of the upright part of the connecting member.

18. The wheelchair of claim 8 wherein the wheel-mounting member is secured to the connecting member by bolts passing transversely through the wheel-mounting member, the connecting member.

19. The wheelchair of claim 8 wherein a spacing member is provided between the upright part of the wheel-mounting member, forward or rearward of the connecting member, the spaced openings of the wheel-mounting member aligning with apertures in the spacing member.

20. The wheelchair of claim 8 wherein the post is provided with a number of spaced transverse apertures and is fixed at the desired height relative to the connecting member by a bolt passing transversely through the connecting member and the post part.

* * * * *